United States Patent
Wiese et al.

(10) Patent No.: US 8,365,247 B1
(45) Date of Patent: Jan. 29, 2013

(54) IDENTIFYING WHETHER ELECTRONIC DATA UNDER TEST INCLUDES PARTICULAR INFORMATION FROM A DATABASE

(75) Inventors: James Wiese, San Ramon, CA (US); James Nisbet, Menlo Park, CA (US); Mark Weng Soon Wah, Raleigh, NC (US)

(73) Assignee: EMC Corporation, Hopkinton, MA (US)

( * ) Notice: Subject to any disclaimer, the term of this patent is extended or adjusted under 35 U.S.C. 154(b) by 645 days.

(21) Appl. No.: 12/495,491

(22) Filed: Jun. 30, 2009

(51) Int. Cl.
*G06F 7/02* (2006.01)
*G06F 17/30* (2006.01)

(52) U.S. Cl. ............ 726/2; 707/698; 707/747; 713/176; 713/180; 713/181; 726/13

(58) Field of Classification Search .................. 713/176, 713/180, 181; 726/2, 13; 707/698, 747
See application file for complete search history.

(56) References Cited

U.S. PATENT DOCUMENTS

| 6,456,729 B1 | 9/2002 | Moore |
| 7,382,248 B2 | 6/2008 | Black, Sr. et al. |
| 7,406,467 B1 | 7/2008 | White |
| 7,565,306 B2 | 7/2009 | Apostolides |
| 7,860,853 B2 * | 12/2010 | Ren et al. ...................... 707/706 |
| 2003/0105739 A1 * | 6/2003 | Essafi et al. ...................... 707/1 |
| 2003/0172066 A1 * | 9/2003 | Cooper et al. ................... 707/7 |
| 2005/0060643 A1 * | 3/2005 | Glass et al. ................ 715/501.1 |
| 2008/0235201 A1 * | 9/2008 | McSherry et al. ................ 707/4 |
| 2009/0164427 A1 * | 6/2009 | Shields et al. .................... 707/3 |
| 2009/0164517 A1 * | 6/2009 | Shields et al. ............. 707/104.1 |
| 2010/0107261 A1 * | 4/2010 | Nagoya et al. .................. 726/30 |

* cited by examiner

*Primary Examiner* — Yin-Chen Shaw
(74) *Attorney, Agent, or Firm* — BainwoodHuang

(57) ABSTRACT

Electronic circuitry includes an input/output (I/O) interface, memory which stores a set of database fingerprints generated from records of a database, and an analyzing circuit coupled to the I/O interface and the memory. The analyzing circuit is constructed and arranged to derive a set of sample tokens from electronic data under test (e.g., an email, an electronic document, etc.), and form a set of sample fingerprints from the set of sample tokens. Each sample fingerprint is based on a sample token of the set of sample tokens. The analyzing circuit is further constructed and arranged to output a result signal based on a comparison between the set of sample fingerprints and the set of database fingerprints. The result signal provides an indication of whether the electronic data under test includes particular information from the database.

15 Claims, 8 Drawing Sheets

EXAMPLE LIST 304 OF QUERY RESULTS 306
(E.G. A TABLE NAMED "PatientDB")

| FirstName | LastName | PatientID | PhoneNumber | Birthday | Gender |
|---|---|---|---|---|---|
| Joe | Smith | 1234 | 555-1212 | 12/23/1973 | M |
| Anne | Doe | 5678 | 567-8329 | 3/14/1980 | F |
| ... | ... | ... | ... | ... | ... |
| Frank | Lee | 9876 | 123-4567 | 7/3/1960 | M |

FIG. 5

EXAMPLE SORTED LIST 316 OF DATABASE FINGERPRINT ENTRIES 318

| H(Token) | RowID | TableID | Flags |
|---|---|---|---|
| 12345678 | 2 | PatientDB | Flags |
| 23458888 | 1 | PatientDB | Flags |
| . . . | . . . | . . . | . . . |
| 55556665 | 19 | PatientDB | Flags |
| 67890000 | 5 | PatientDB | Flags |
| 77778888 | 8 | PatientDB | Flags |
| . . . | . . . | . . . | . . . |
| ADDITIONAL INFORMATION 500 | | | |

318(a) → 42 points to row with 23458888, 1 (500), PatientDB (502), Flags (504)

FIG. 6

EXAMPLE LIST 700 OF SEARCH RESULTS

| SampleTextOffset | LengthOfMatch | RowID | TableID | Require/Optional | IsMulti-Token |
|---|---|---|---|---|---|
| 24 | 6 | 43 | PatientDB | Required | False |
| 52 | 6 | 43 | PatientDB | Required | False |
| 60 | 6 | 43 | PatientDB | Required | False |
| 69 | 6 | 43 | PatientDB | Required | False |
| 124 | 6 | 48 | PatientDB | Required | False |
| 152 | 6 | 48 | PatientDB | Required | False |
| 160 | 6 | 48 | PatientDB | Required | False |
| 169 | 6 | 48 | PatientDB | Required | False |
| . . . | . . . | . . . | . . . | . . . | . . . |

FIG. 8

IDENTIFYING WHETHER ELECTRONIC DATA UNDER TEST INCLUDES PARTICULAR INFORMATION FROM A DATABASE

BACKGROUND

It is commonplace for companies to impose policies intended to protect sensitive data. For example, a company may impose a policy that prohibits employees from leaving its premises with laptop computers containing confidential customer credit card information. Such a policy attempts to eliminate the possibility of someone stealing an employee's laptop computer and obtaining access to the confidential customer credit card information from the stolen laptop computer.

One conventional approach to preventing an employee from inadvertently transferring an electronic document containing customer credit card information to a laptop computer is for the company to impose a policy requiring the employee to read through each electronic document prior to storing that electronic document on the laptop computer. Unfortunately, even if mandated, such a policy is difficult to enforce and is extremely burdensome on the employee.

To assist the employee, a conventional tool exists which is designed to scan an electronic document for data having a particular format. For example, to determine whether a document contains customer credit card information, the conventional tool scans the document for a string of characters having the format "####-####-####-####" where # is a character of the set $\{0, 1, 2, 3, 4, 5, 6, 7, 8, 9\}$.

SUMMARY

Unfortunately, there are deficiencies to the above-described conventional tool which scans an electronic document for a particular data format. For example, suppose that company policy permits the employee to store the employee's personal credit card information in a personal document on the laptop computer. If the employee uses the conventional tool to scan a personal document containing the employee's personal credit card information, the conventional tool would incorrectly detect the personal document as a document containing customer credit card information, i.e., the conventional tool would register a "false positive".

In some situations, such false positives can be a nuisance and hinder detection of actual policy violations. For example, suppose that a healthcare company prohibited the release of documents containing patient addresses and related patient information. Unfortunately, if an employee adapted the conventional tool to detect electronic documents containing data having an address format, the employee would detect not only electronic documents containing patient addresses, but also electronic documents which do not contain patient addresses. In particular, the conventional tool would detect electronic documents containing acceptable non-patient addresses having the same address format such as the employee's work address and colleague addresses. In such a situation, numerous false positives could bury an actual policy violation.

In contrast to the above-described conventional tool which scans an electronic document for a particular data format, improved techniques involve comparing electronic fingerprints (e.g., hash values) to identify whether electronic data under test (e.g., a sample file) includes particular information from a database. In particular, during an accumulation phase, database fingerprints are derived from reference data from the database. Additionally, during an analysis phase, sample fingerprints are derived from the electronic data under test and compared to the database fingerprints to determine whether the electronic data under test includes the reference data. Contrary to conventional format matching, the improved techniques can accurately distinguish information represented in the same format, e.g., a patient address vs. an employee address, since the electronic fingerprints identify data more specifically than simple data formats. For example, fingerprinting patient records from a healthcare database can be useful in distinguishing patient information from non-patient information such as employee information.

One embodiment is directed to electronic circuitry which includes an input/output (I/O) interface, memory which stores a set of database fingerprints generated from records of a database, and an analyzing circuit coupled to the I/O interface and the memory. The analyzing circuit is constructed and arranged to derive a set of sample tokens from electronic data under test (e.g., an email, an electronic document, etc.), and form a set of sample fingerprints from the set of sample tokens. Each sample fingerprint is based on a sample token of the set of sample tokens. The analyzing circuit is further constructed and arranged to output a result signal based on a comparison between the set of sample fingerprints and the set of database fingerprints. The result signal provides an indication of whether the electronic data under test includes particular information from the database.

Accordingly, one can use the result signal to block subsequent access to the electronic data under test. For example, the result signal is capable of preventing an email message containing sensitive information from being sent from a user's computer or through a network device. As another example, the result signal is capable of preventing a sensitive document from being copied to a non-secure location such as a laptop computer or a Universal Serial Bus (USB) memory device.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIG. 5 is an example of a list of query results utilized by the process of FIG. 4.

FIG. 6 is an example of a sorted list of database fingerprints generated by the process of FIG. 4.

FIG. 8 is an example of search results utilized by the process of FIG. 7.

DETAILED DESCRIPTION

An improved technique involves comparing electronic fingerprints (e.g., hash values) to identify whether electronic data under test includes particular information from a database. Such fingerprinting is preferably separated into two phases. During an accumulation phase, database fingerprints are derived from reference data from the database. Furthermore, during an analysis phase, sample fingerprints are derived from the electronic data under test (e.g., an electronic file) and compared to the database fingerprints to determine whether the electronic data under test includes the reference data. In contrast to conventional format matching, the improved technique is capable of accurately distinguishing information represented in identical format, e.g., a patient address vs. an employee address even when both addresses are in exactly the same address format: street number, street name, city, state, zip code, etc.

Figure 1:
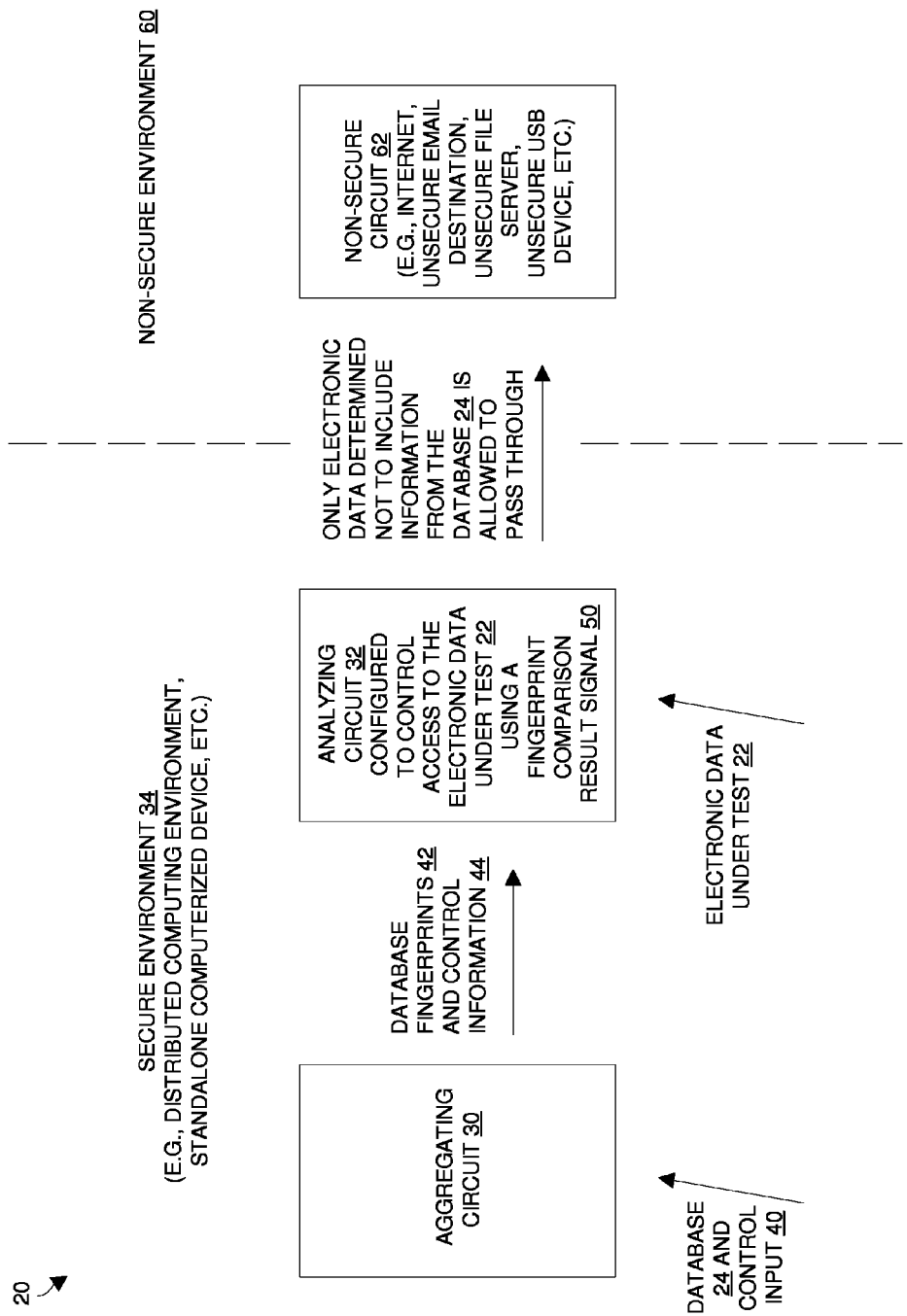
FIG. 1 is a block diagram illustrating the relationship between various circuits in accordance with the improved techniques.

FIG. 1 illustrates various circuits of an electronic system 20 which is capable of identifying whether electronic data under test 22 includes particular information from a database 24 (e.g., sensitive data that should not be allowed to reach an unsecured location such as patient records from a healthcare database). The electronic system 20 includes an aggregating circuit 30 and an analyzing circuit 32 both of which reside in a secure environment 34. In some arrangements, the aggregating circuit 30 and the analyzing circuit 32 reside on separate computerized devices (e.g., independent computers within a distributed computer environment such as a secure LAN). In other arrangements, the aggregating circuit 30 and the analyzing circuit 32 share at least some of the same computer resources (e.g., both reside on a standalone computer running an aggregating application and an analyzing application as high level programs over an operating system).

The aggregating circuit 30 is configured to access the database 34 as well as receive separate control input 40 (e.g., from a user), and generate database fingerprints 42 based on accessing the database 34 and the control input 40 (e.g., instructions which guide the aggregating circuit 30 to produce fingerprints 42 having certain matching criteria and which guide the analyzing circuit 32 to apply certain matching rules). The aggregating circuit 30 provides the database fingerprints 42 and control information 44 (e.g., fingerprint matching criteria) to the analyzing circuit 32 for use when the analyzing circuit 32 processes the electronic data under test 22.

The analyzing circuit 32 is configured to receive the database fingerprints 42 and the control information 44 from the aggregating circuit 30, and analyze the electronic data under test 22 based on the database fingerprints 42 and the control information 44. In particular, under direction of the control information 44, the analyzing circuit 32 is configured to provide a fingerprint comparison result signal (or message/report) 50 based on a comparison between the database fingerprints 42 and sample fingerprints derived from the electronic data under test 22. That is, the result signal 50 provides an indication of whether the electronic data under test 22 includes information from the database 24 (e.g., a positive or negative comparison value).

Accordingly, if the information from the database 24 is considered to be sensitive, the result signal 50 can be used to control access to the electronic data under test 22. In particular, the result signal 50 can be used to allow or prevent the electronic data under test 22 from reaching a non-secure environment 60. For example, in the context of an email message (i.e., the electronic data under test 22), the result signal 50 can be used to allow or prevent a user's workstation or network device (i.e., the analyzing device 32) from sending or forwarding the email message to a non-secure circuit 62 such as an unsecure recipient's computer, the Internet, etc. depending on whether the email message contains sensitive information from the database 24. As another example, in the context of an electronic document (i.e., the electronic data under test 22), the result signal 50 can be used to allow or prevent a user's workstation from transferring the electronic document to an unsecure USB peripheral or an unsecure server (i.e., the non-secure circuit 62). Further details will now be provided with respect to FIG. 2.

Figure 2:
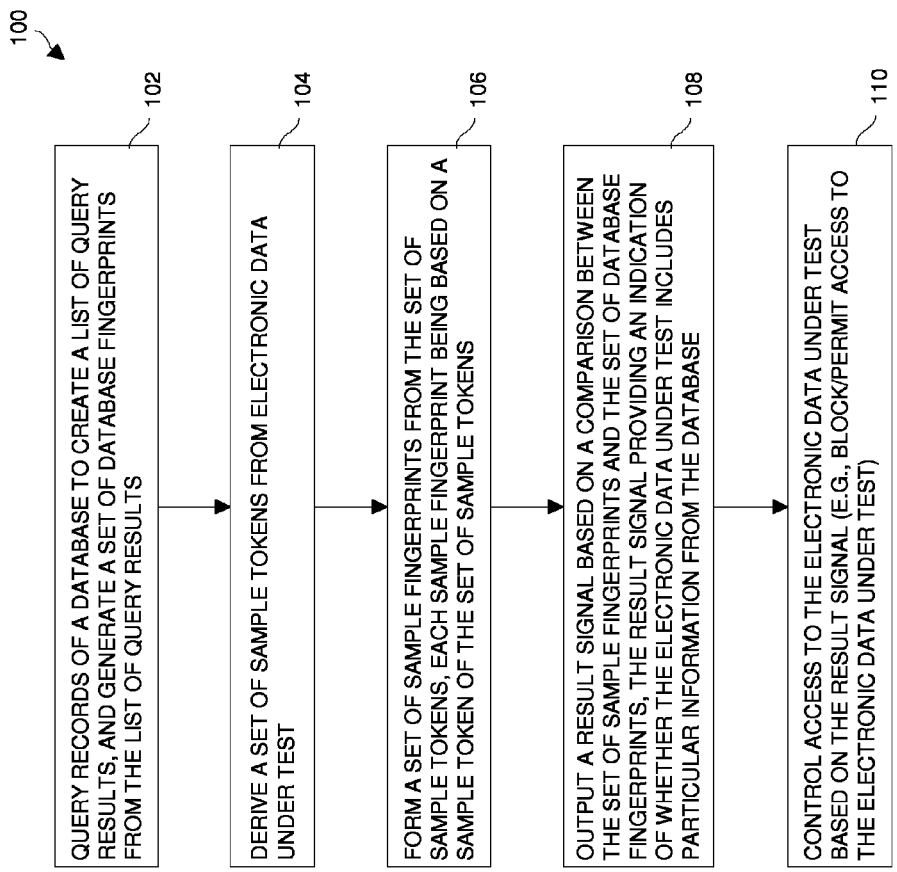
FIG. 2 is flowchart of a procedure which is performed by the various circuits of FIG. 1.

FIG. 2 is flowchart of a procedure 100 which is performed by the various circuits of the electronic system 20 (also see FIG. 1). The procedure 100 provides a summary of the general operation before explanations of the circuits are provided at a more-detailed level with reference to other figures. It should be understood that records of the database 24 contain sensitive information that should not be allowed to reach the non-secure environment 60 (also see FIG. 1).

In step 102, the aggregating circuit 30 queries records of the database 24 to create a list of query results. From this list of query results, the aggregating circuit 30 generates a set of database fingerprints 42. The set of database fingerprints 42 is then made available to the analyzing circuit 32. As will be explained in further detail later and with reference to FIG. 5, the list of query results is a two-dimensional table having rows and columns (or similar logical structure). Each row of the list corresponds to a record of the database 24 and includes a set of tokens. Each database fingerprint 42 results from application of a predefined hash function to a token of the list and is eventually stored in another list (FIG. 6).

In step 104, the analyzing circuit 32 derives a set of sample tokens from the electronic data under test 22. In particular, the analyzing circuit 32 parses text from the electronic data under test 22 into a series of un-normalized words, and removes predefined characters (e.g., white space, invisible characters and separators, carriage returns, etc.) from the series of un-normalized words to form, as the set of sample tokens, a series of normalized words. In contrast to a conventional data format (i.e., a general pattern devoid of specific characters), each normalized word includes a string of actual characters (e.g., case-neutral letters, numbers, etc.) defining real information.

In step 106, the analyzing circuit 32 forms a set of sample fingerprints from the set of sample tokens. In particular, to generate the set of sample fingerprints, the analyzing circuit 32 applies the same predefined hash function used by the aggregating circuit 30 (also see step 102). That is, each sample fingerprint results from application of the predefined hash function to a sample token.

In step 108, the analyzing circuit 32 compares the sample fingerprints to the database fingerprints, and outputs the fingerprint comparison result signal 50 based on the comparison between the sample fingerprints and the database fingerprints. The result signal 50 provides an indication of whether the electronic data under test 22 includes information from the database 24, i.e., a representation of whether the analyzing circuit 32 has detected database information in the electronic data under test.

In step 110, the analyzing circuit 32 controls access to the electronic data under test 22 based on the fingerprint comparison result signal 22. In particular, if the result signal 22 includes a value indicating that the electronic data under test 22 contains information from the database 24, the analyzing circuit 32 can prohibit transmission of the electronic data under test 22 to the unsecure environment 60. However, if the result signal 22 includes a value indicating that the electronic data under test 22 does not contain information from the database 24, the analyzing circuit 32 can permit transmission of the electronic data under test 22 to the unsecure environment 60. Further details will now be provided with reference to FIG. 3.

Figure 3:
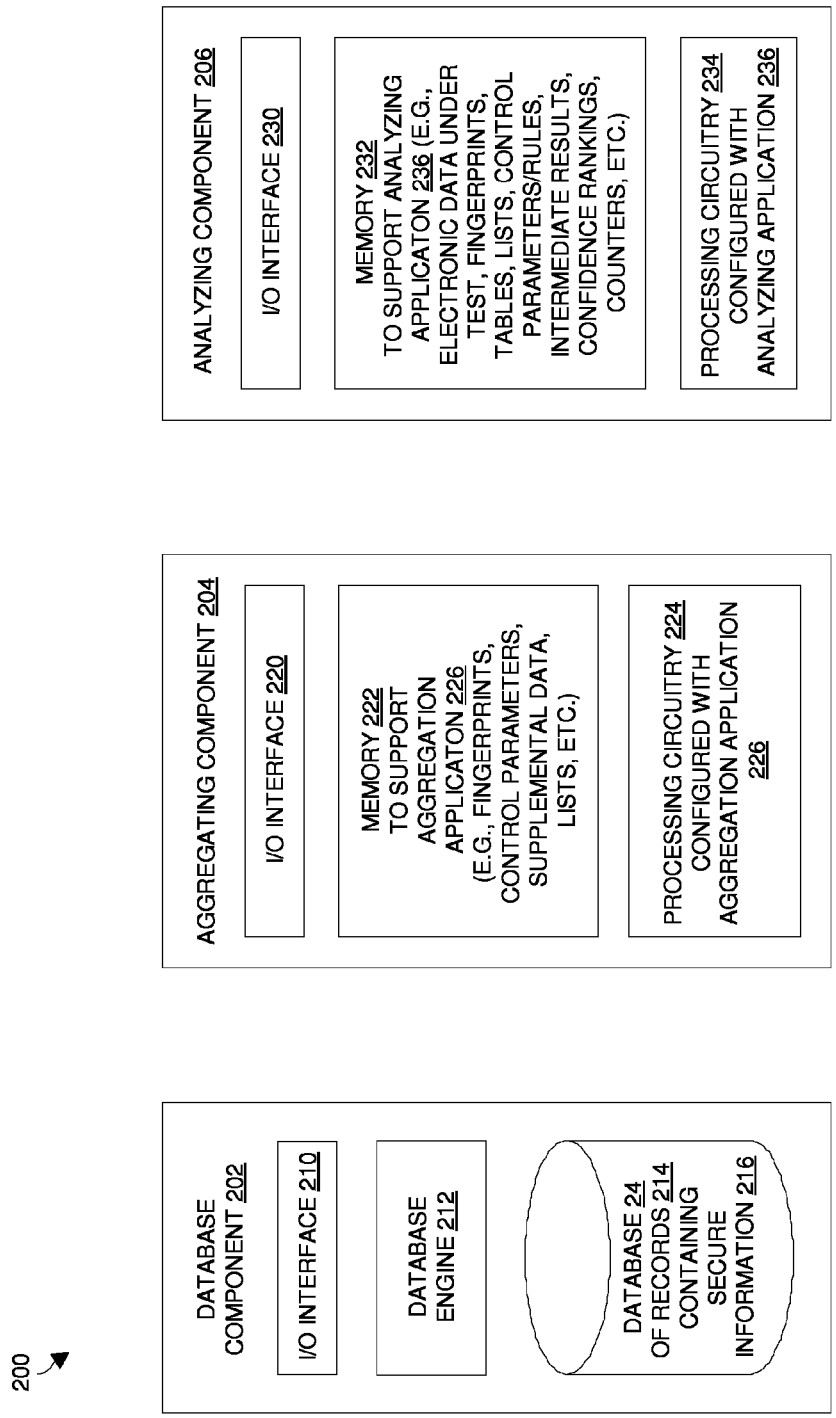
FIG. 3 is a block diagram of particular component details of the various circuits of FIG. 1.

FIG. 3 shows an example component arrangement which is suitable of use as the electronic system 20. This arrangement includes a database component 202, an aggregating component 204, and an analyzing component 206.

By way of example, each component is provisioned as a separate standalone computerized device. Along these lines, the database component 202 includes an input/output (I/O) interface 210 (e.g., a network interface card), a database engine 212, and a database of records 214 containing secure information 216. The I/O interface 210 is configured to enable the database component 202 to communicate with other devices. The database engine 212 is configured to load data into and retrieve data from the database 24, which may reside on an array of disk drives or similar set of storage units. In particular, the database engine 212 is configured to query the database 24 on behalf of the aggregating component 204.

The aggregating component 204 includes an I/O interface 220 for external communications, memory 222 (e.g., a combination of volatile and non-volatile storage) for supporting operation, and processing circuitry 224. The processing circuitry 224 (e.g., one or more microprocessors or blade devices) runs an aggregation application 226 when generating the database fingerprints 42 from the records 214 containing the secure information 216 (also see FIGS. 1 and 2). The memory 222 stores the database fingerprints 42 among other information during this process. Further details of the database fingerprint generation process will be provided shortly with reference to FIGS. 4 through 6.

Still with reference to FIG. 3, the analyzing component 206 includes an I/O interface 230 for external communications, memory 232 for supporting operation and processing circuitry 234. The processing circuitry 234 runs an aggregation application 236 when generating the sample fingerprints 42, and outputting the result signal 50. The memory 232 stores electronic data under test 22 and intermediate results among other information during this process. Further details of the analysis process will be provided shortly with reference to FIGS. 7 and 8.

One will appreciate that the components 202, 204, 206 of FIG. 3 can be modified and or partitioned into arrangements that are different than the standalone arrangement of FIG. 3. For example, one or more of the components 202, 204, 206 can reside in a single device. Along these lines, when the database component 202 and the aggregating component 204 reside in the same device, there is no need for the contents of the database 24 to pass through a computer network that may potentially be less-secure and/or limit bandwidth/throughput. As another example, when the aggregating component 204 and the analyzing component 206 reside on the same device, there is no need to transfer the database fingerprints 42 and the control information 44 from the aggregating component 204 to the analyzing component 206. Rather, the database fingerprints 42 and the control information 44 are available to the analyzing component 206 as soon as the aggregating component 204 stores them in memory 222/232. Further details will now be provided with reference to FIGS. 4 through 6.

Figure 4:
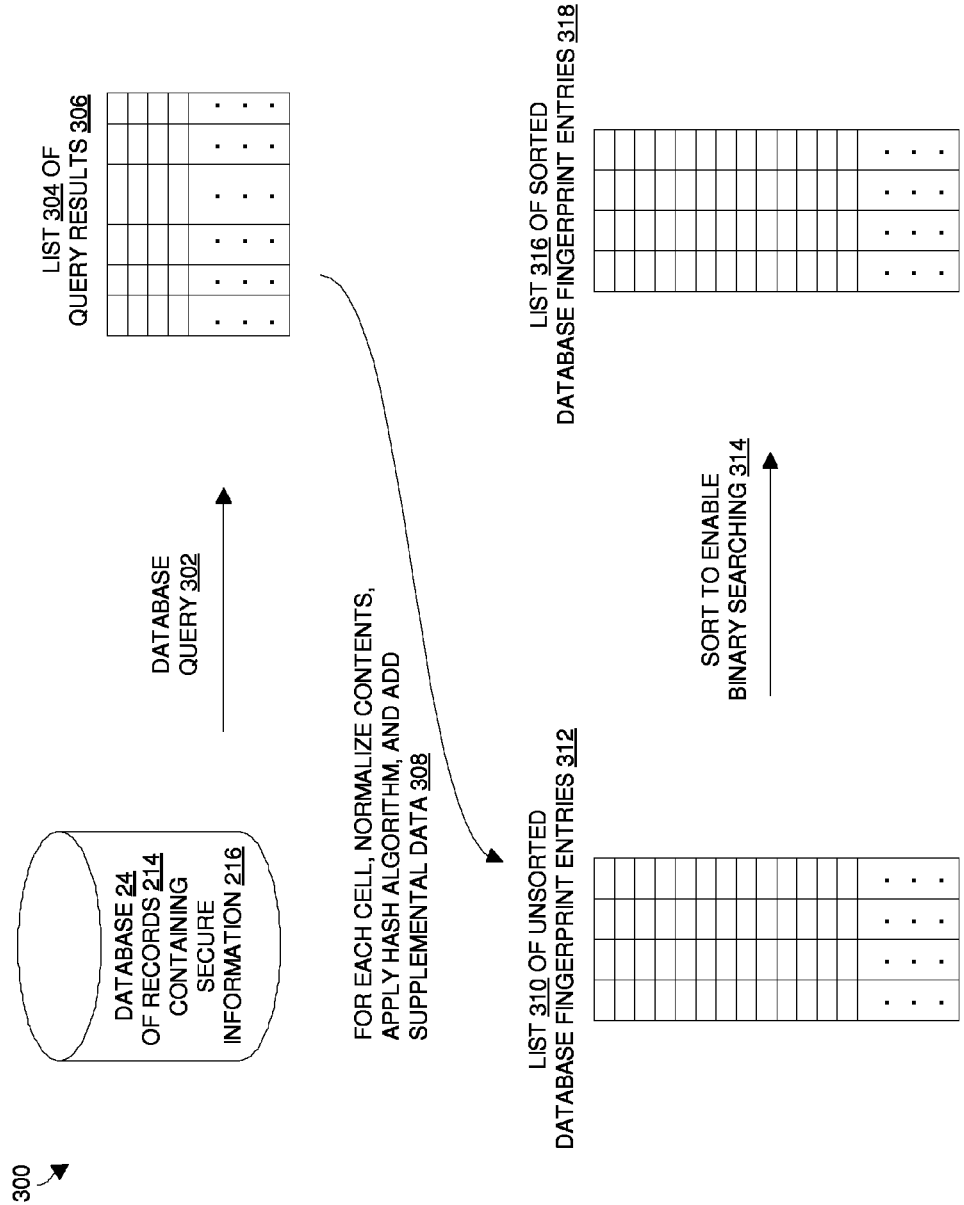
FIG. 4 is a process diagram illustrating a process of accumulating database fingerprints from reference data stored in a database.

FIGS. 4 through 6 provide greater detail regarding the process of generating database fingerprints from reference data stored in the database 42 during the accumulation phase. FIG. 4 shows a general diagram 300 of the process of accumulating database fingerprints 42 which is performed by the aggregating circuit 30. FIG. 5 shows an example list of query results utilized by the process. FIG. 6 shows an example list of database fingerprints 42 generated by the process.

As shown in FIG. 4, the aggregating circuit 30 essentially 'crawls' through the database 24 by performing a series of operations to generate a set of database fingerprints 42. Namely, the aggregating circuit 30 performs a database query 302 on the database 24 to form a list 304 of query results 306. Then, the aggregating circuit 30 performs a processing operation 308 on the list 304 of query results 306 to form a list 310 of unsorted database fingerprint entries 312. Next, the aggregating circuit 30 performs a sorting operation 314 on the list 310 of unsorted database fingerprints 312 to form a list 316 of sorted database fingerprint entries 318. Further details of each operation will now be provided in the context of an example database 24 of records 214 containing confidential patient information 216.

Suppose that a company maintains a database 24 of records 214 containing confidential patient information 216 (i.e., a healthcare database containing confidential patient records), and that the company wishes to impose a policy that restricts the confidential patient information 216 from being sent in unencrypted form in email messages to target destinations outside the company. Further suppose that the database 24 and the aggregating circuit 30 reside on a common computerized device within the company's secure LAN, and that the analyzing circuit 32 resides on a network device (e.g., a gateway, a bridge, a firewall, etc.) which separates the LAN from a non-secure computer network (e.g., the Internet).

To enforce the company's policy and with reference to FIG. 4, the aggregating circuit 30 performs the database query 302 on the database 24 to extract and organize particular confidential patient information 216 in tabular form. FIG. 5 shows an example list 304 of query results 306 which is outputted by the database engine 212 (FIG. 3) in response to the database query 302. The list 304 is a two-dimensional arrangement of cells 400 containing items (or tokens) 402 of patient information 216. In particular, each row 404(1), 404 (2), . . . , 404(x) (collectively, rows 404) of the list 304 is a query result 306 which includes patient information 216 corresponding to a particular record 214 of the database 24 (FIG. 4). Each column 406(1), 406(2), . . . , 406(y) (collectively, columns 406) corresponds to a particular type of item of patient information 216 such as a patient's first name, last name, and so on.

Each item 402 is an un-normalized word formed of a string of actual characters, i.e., one or more characters or symbols unless the cell 400 is empty. When the aggregating circuit 30 performs the processing operation 308, the aggregating circuit 30 reads the contents (i.e., the text) from each cell 400 and normalizes the contents. For example, the aggregating circuit 30 removes white space, meta-characters and invisible characters/symbols. As another example, the aggregating circuit 30 neutralizes letter capitalization so that there is no distinction between upper and lower case. The result is a set of normalized tokens 402.

Next, the aggregating circuit 30 applies a hash function H( ) to each normalized token to produce, as a database fingerprint 42, a conveniently searchable hash value (e.g., a fixed-length index/key). There are a variety of standard hash algorithms which are suitable for use, and the particular hash algorithm is preferably based on an appropriate level of determinism or indexing, and size of the database 24. For example, a 3-byte hash value can represent up to 16,777,216 rows. A Cyclic redundancy check (CRC) algorithm is an example of a suitable hash function. A partial MD5 representation is another example of a suitable hash function. If a particular hash function is applied that provides lengthier hash values, the hash values can be truncated to a more-manageable lengths if desired.

The aggregating circuit 30 stores the database fingerprints 42 in database fingerprint entries 312 in an unsorted list 310 (FIG. 4). Each fingerprint entry 312 includes a database fingerprint 42 derived from a particular token 402, the row number (i.e., 'RowID') of that token 402, the source table/database number or name (i.e., 'TableID') of that token 402, and a set of flags corresponding to the particular token 402. Such flags enable multi-token support (i.e., the ability to factor in the notion of proximity) for searching compound items such as addresses, part numbers, etc. Such flags also enable the number of database fingerprints 42 being indexed to be extended in the event that the original fingerprint size is inadequate.

The aggregating circuit 30 then sorts the database fingerprint entries 318 to form a sorted list 316 (FIG. 4). FIG. 6 shows an example sorted list 316 of database fingerprint entries 318. The entries 318 increase (or alternatively decrease) monotonically based on the value of the database fingerprint 42 for that entry 318.

As shown in FIG. 6, each fingerprint entry 318 of the list 316 includes a database fingerprint 42 derived from hashing a particular token 402, the RowID 500 of that token 402 (i.e., the row 404 of the list 304 from which the particular token 402 was generated, also see FIG. 5), the TableID 502 of that token 402, and the set of flags 504 corresponding to the token 402. The aggregating circuit 30 stores the list 316 with additional information 500 (e.g., in a header and/or footer) in a binary file for use in the analysis phase. Examples of the additional information 500 include matching rules such as an identification of which item types are required for a token matches, which item types are optional token matches, a predefined number of required token matches to constitute a records match, proximity criteria, etc.

To review and by way of example only, the fingerprint entry 318(*a*) in FIG. 6 is based on application of the hash function H( ) to the last name "Smith" of row 404(1) of the list 304 (also see FIG. 5). That is, the hash value resulting from H(Smith) is "2345888". Additionally, the RowID is "1" representing the row number of row 404(1) in the list 304, and the TableID is "PatientDB" representing the name of the list 304 (i.e., the source).

The aggregating circuit 30 then conveys the sorted list 316 of database fingerprint entries 318 to the analyzing circuit 32 (FIG. 1). At this point, it should be understood that the sorted list 316 of database fingerprint entries 318 enables efficient binary searching using the database fingerprints 42 themselves as indexes since the database fingerprints 42 progress monotonically. Such a structure alleviates the need for the analyzing circuit 32 to perform an additional level of translation during searching.

Before an in-depth discussion of analysis phase using the sorted list 316 is provided, it should be understood that a clear distinction should be drawn between (i) matching a sample fingerprint to a database fingerprint and (ii) forming a positive conclusion that the electronic data under test 22 includes database information. For instance, since both an email message and a database record could easily include the same first name such as "Joe", it is quite possible that a sample fingerprint could match a database fingerprint (e.g., hashes of the name "Joe"). However, for the analyzing circuit 32 to positively conclude that the electronic data under test 22 includes database information, the analyzing circuit 32 must find fulfillment of particular matching rule criteria such as finding a predetermined number of required matches of a database record.

In the context of the example, suppose that the particular matching rule criteria (also see the control input 40 and control information 44 in FIG. 1) imposes a requirement that the FirstName, LastName and PatientID item types be found for the same database record. If this requirement is not satisfied, then the analyzing circuit 32 considers no match to be found due to insufficient information. Further suppose that, if these item types are found for the same database record, the matching rule criteria imposes a requirement that one of the other item types also be found in order for the analyzing circuit 32 to positively conclude that an email message contains information from the database 24.

In view of the above-described matching rule criteria, the following email message would not constitute a match with the example list 304 of FIG. 5:

Hi all,
I'd like to invite you to our annual picnic this Friday, please RSVP:
555-1212
Joe Smith Here, there is matching between the first name and last name but no matching of Patient ID.

However, the following email message would constitute a match with the example list 304 of FIG. 5:

Report on epidermal cancer scan for:
Joe Smith
1234
Dec. 23, 1973
Conclusive negative results for a melanoma tumor were found. Please contact your primary physician if you have any questions Here, there is matching of all three required item types, i.e., first name, last name and Patient ID. Furthermore, there is matching between at least one other item type, i.e., birthday. Further details of how the analyzing circuit 32 (i) matches individual fingerprints and (ii) determines whether the electronic data under test 22 includes database information will now be provided with reference FIGS. 7 and 8.

Figure 7:
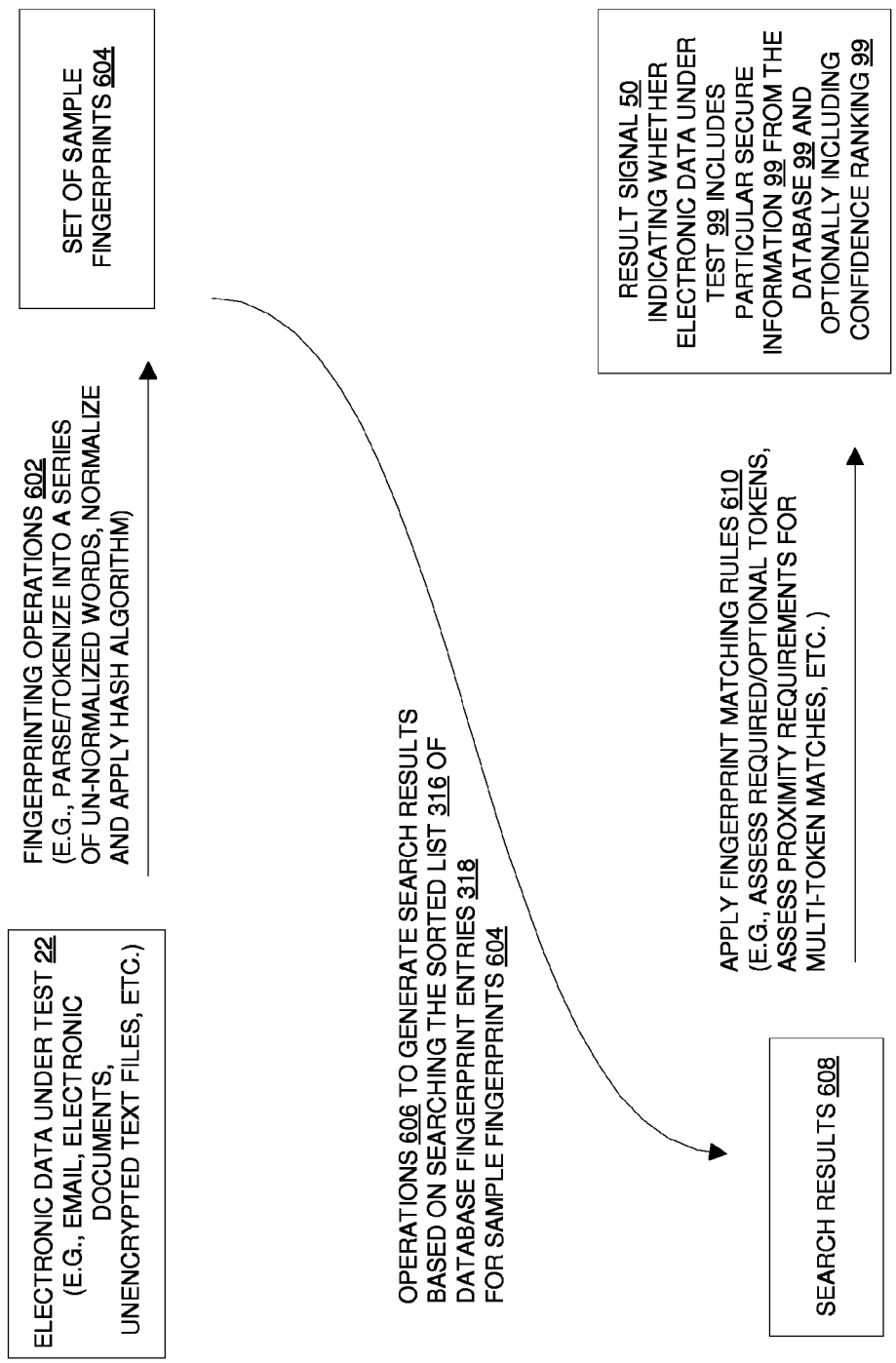
FIG. 7 is a process diagram illustrating a process of analyzing electronic data under test to determine whether the electronic data under test includes the reference data from the database.

FIG. 7 illustrates a process 600 which is performed by the analyzing circuit 32 to determine whether the electronic data under test 22 includes information 216 from the database 24 during the analysis phase. FIG. 8 is an example list 700 of search results which are produced during the process 600. The process 600 begins with the analyzing circuit 32 receiving and loading the sorted list 316 of database fingerprint entries 318 from the aggregating circuit 30. Such operation preferably involves storing the sorted list 316 within high speed memory for searching access (e.g., caching the sorted list 316, also see the memory 232 in FIG. 3).

As shown in FIG. 7, the analyzing circuit 32 extracts text from the electronic data under test 22, and performs fingerprinting operations 602 to generate a set of sample fingerprints 604 from the electronic data under test 22. In the context of the patient database example, recall that the analyzing circuit 32 resides on a network device separating the company's LAN from a non-secure environment. In this example, the electronic data under test 22 can take the form of an email message which is sent from a user's workstation to an email destination residing in the non-secure environment through the network device having the analyzing circuit 32. The analyzing circuit 32 intercepts the email message before it is able to reach the non-secure environment, and operates in accordance with the process 600.

When the analyzing circuit 32 performs the fingerprinting operations 602, the analyzing circuit 32 parses the electronic data under test 22 into a series of un-normalized words (i.e., strings of actual characters). The analyzing circuit 32 then normalizes the words, i.e., forms normalized words by removing white space, meta-characters and invisible characters/symbols, as well as neutralizing letter capitalization. Next, the analyzing circuit 32 applies the hash function H( ) to each normalized word (i.e., to each item/token) of the electronic data under test 22 to form a sample fingerprint 604 corresponding to that normalized word.

At this point, the set of sample fingerprints 604 is ready for matching against the database fingerprints 42. If a match occurs, this indicates that the fingerprinted token of the electronic data under test 22 (e.g., a word in the email message) matches a token from the database 24 (e.g., a word in a cell 400 of the list 304 of query results 306, also see FIG. 5).

Along these lines, the analyzing circuit 32 performs operations 606 to generate search results 608, i.e., a list 700 of matches between the sample fingerprints 604 and the database fingerprints 42, also see FIG. 8. Preferably, the analyzing circuit 32 performs an efficient binary search of the sorted list 316 of database fingerprint entries 318 (FIGS. 4 and 6) using the sample fingerprints 604 as indexes into the sorted list 316. If the analyzing circuit 32 finds a match, the analyzing circuit 32 adds a line entry 702 to the list 700 of search results (FIG. 8).

Recall that the additional information 500 preferably includes matching rules (also see FIG. 6). In some arrangements, the matching rules require certain fields (e.g., First-Name, LastName and PatientID) to match before the analyzing circuit 32 concludes that the electronic data under test 22 includes database information 216, i.e., a positive match decision. In some arrangements, if the analyzing circuit 32 finds that the electronic data under test 22 includes a sufficient number of tokens of a row in the list 304 of query results 306, the analyzing circuit 32 concludes that electronic data under test 22 contains the database information 216. Other evaluation approaches are suitable for use as well such as computing confidence rankings/weightings, determining whether a policy violation has occurred, etc.

In the context of requiring certain item type matches, reference is made back to FIG. 5 which shows the list 304 of query results 306. Recall that each column 406 refers to a particular item type (e.g., FirstName, LastName, etc.). With this in mind, a user (e.g., an administrator) can specify which types of items must match in order for the analyzing circuit 32 to conclude that that the electronic data under test 22 includes database information 216. For example, the user can require that the electronic data under test 22 must contain a First-Name, a LastName, and a PatientID of a record 214 in the database 24 in order for the analyzing circuit 32 to positively conclude that the data under test 22 contains database information 216.

As shown in FIG. 8, each row 702 of the list 700 corresponds to a match between a sample fingerprint 604 and a database fingerprint 42. Each row 702 includes a SampleTextOffset field 704, a LengthOfMatch field 706, a RowID field 708, a TableID field 710, a Required/Optional field 712, and an IsMulti-Token field 714. The SampleTextOffset field 704 for stores, as its contents, an offset of the matching fingerprinted token of the electronic data under test 22. The LengthOfMatch field 706 stores, as its contents, a value corresponding to the length of the match. The RowID field 708 stores, as its contents, the row number (i.e., the RowID) of the matching database fingerprint 42 (also see FIG. 6). The TableID field 710 stores, as its contents, the source (i.e., TableID) of the matching database fingerprint 42. The Required/Optional field 712 stores, as its contents, an indication of whether the fingerprinted token is required for a true positive determination of a match or if the fingerprinted token is optional. The IsMulti-Token field 714 stores, as its contents, an indication of whether the fingerprinted token requires compound matching items such as when matching parts of an address.

With reference back to FIG. 7, the analyzing circuit 32 performs operations 610 to process the list 700 of search results and thus determine whether the electronic data under test 22 contains reference data of the database 24. In particular, the analyzing circuit 32 applies matching criteria to determine whether to positively conclude that the data under test 22 contains database information. One suitable technique is to structure the list 700 as a Bloom filter which can be efficiently queried by the analyzing circuit 32. Along these lines, the analyzing circuit 32 takes into consideration whether the match entries 702 are required, and whether the match entries 702 are for multi-token matching (also see the additional information 500 in FIG. 6 which stores matching criteria).

Recall that the matching criteria can impose requirements for a true match, i.e., a positive conclusion that the data under test 22 includes database information, such as matching rules requiring particular types of matching items a particular number of matching compound items. If particular required types of items match, the analyzing circuit 32 considers the electronic data under test 22 to contain information of the database 24. In the patient database example, the company may require the first name, last name and the patient number (i.e., PatientID) as required for a positive match. Accordingly, the analyzing circuit 32 makes sure that the sample fingerprints 604 for these items match database fingerprints 42 of a particular record 214.

Additionally, based on the matching rules, the company may impose, as a threshold, a predetermined number of matches in record items as criteria for concluding that the electronic data under test 22 contains information of the database 24. In this arrangement, the analyzing circuit 32 counts the number of match entries 702 for each RowID. If there exists at least the predetermined number of match entries for any RowId, i.e., for any record 214 of the database 24, the analyzing circuit 32 concludes that the electronic data under test 22 contains information of the database 24. For example, suppose that the company requires that the analyzing circuit 32 find at least one more item type (i.e., four or more matches) in an email message to match a record of the database 24. As shown in FIG. 8, there are at least five match entries 702 in the list 700 corresponding to RowID 43. Accordingly, the analyzing circuit 32 concludes that the electronic data under test 22 includes sensitive information from the database record 214 in row number 43 of the list 304 of query results 306 (FIG. 5).

Based on the matching rules, when the analyzing circuit 32 determines that the electronic data under test 32 includes sensitive information from the database record 214, the analyzing circuit 32 can stop further matching. That is, the analyzing circuit 32 does not need to perform additional searching since it has already discovered database information in the data under test 22.

At this point, the analyzing circuit 32 outputs the result signal 50 indicating that there is a proper match. In particular, the result signal 50 can contain a flag or field indicating that the analyzing circuit has found a true positive match of database information corresponding to a database record 214 in the electronic data under test 22. In the example, the data communications circuitry of the network device can respond to this result signal 50 by blocking access to the electronic data under test 22. That is, the data communications circuitry can (i) stop further transmission of the email message along the targeted destination pathway so that the email message is prevented from reaching the non-secure environment and (ii) returning a non-delivery notification to the user's workstation.

If, based on the matching rules, the analyzing circuit 32 processes all of the sample fingerprints 604 but does not find that there is a true match, the analyzing circuit 32 concludes that the electronic data under test 22 does not contain sensitive information from the database 24. For example, although the analyzing circuit 32 may have found some matching items here and there within the electronic data under test 22, the analyzing circuit 32 may have not found all required matching types for a true positive match. Similarly, the analyzing circuit 32 may have not found enough matches to meet the predetermined number of matches criteria. As yet another example, the analyzing circuit 32 may have not been able to satisfy a proximity requirement of the matching rules, i.e., where certain words if found must be within a particular word range of other words for a proper match. In these situations, the analyzing circuit 32 outputs the result signal 50 indicating that there is no proper match. In particular, the result signal 50 can contain a flag or field indicating that the analyzing circuit 32 not found a true positive match, i.e., there was no sensitive information from the database 24 found in the electronic data under test 22. In the example, the data communications circuitry of the network device can respond to the result signal 50 by permitting access to the electronic data under test 22, i.e., forwarding the email message on to the non-secure device residing in the non-secure environment.

As described above, improved techniques involve comparing electronic fingerprints 42, 604 (e.g., hash values) to identify whether electronic data under test 22 (e.g., a sample file) includes particular information 216 from a database 24. In particular, during an accumulation phase, database fingerprints 42 are derived from reference data 216 from the database 24. Additionally, during an analysis phase, sample fingerprints 604 are derived from the electronic data under test 22 and compared to the database fingerprints 42 to determine whether the electronic data under test 22 includes the reference data 216. Contrary to conventional format matching, the improved techniques can accurately distinguish information represented in the same format, e.g., a patient address vs. an employee address, since the electronic fingerprints identify data more specifically than simple character string formats.

While various embodiments of the invention have been particularly shown and described, it will be understood by those skilled in the art that various changes in form and details may be made therein without departing from the spirit and scope of the invention as defined by the appended claims.

For example, it should be understood that the electronic data under test 22 was described above as an email message, and the analyzing circuit 32 was described above as controlling further transmission of the email message by way of example only. Other applications are suitable for use as well. For instance, the analyzing circuit 32 may reside as an agent within a client or a server of a data storage system and control whether the client or server is able to store an electronic document containing certain information. In this situation, the result signal 50 is capable of preventing copying of the electronic document from a secure electronic device to a non-secure electronic device. Alternatively, if the agent discovers an electronic document having sensitive database information on a server or intercepts a command to store an electronic document having such information, the result signal 50 can be used to trigger some other protective activity such as encrypting the electronic document prior to storage, blocking copying of the electronic document, preventing movement of the electronic document onto a USB device or other non-secure location, and so on.

Additionally, it should be understood that the above-described matching rules are capable of imposing a variety of matching requirements. An example of a suitable matching requirement is required types of matches such as first name, last name, patientID, etc. Another example is a proximity threshold, i.e., a distance between discovered individual fingerprint matches for multi-token matching such as addresses having street names, city names and states.

Furthermore, it should be understood that the analyzing circuit 32 was described above as stopping as soon as it detected a true positive match. In some arrangements, the analyzing circuit 32 does not stop but tries to match all sample fingerprints 604 to the database fingerprints 42. In this situation, the analyzing circuit 32 is capable of matching database fingerprints 42 which are considered to be optional rather than required. That is, an optional database fingerprint 42 is required for a true positive match. Rather, if a sample fingerprint 604 matches an optional database fingerprint 42, additional information is added to the result signal 50 to indicate a higher confidence ranking of a potential match. Accordingly, a user can review a weighted or ranked report on whether the electronic data under test 22 includes sensitive database information.

Additionally, it should be understood that the above-provided example was directed to a patient database by way of example only. There are a variety of other good and useful applications as well. Along these lines, the improved techniques can be applied to any situation in which there is a need to compare electronic data to a source of control data such as a database. For example, contrary to a conventional approach of looking for a format of an account number, a first name, a last name, etc., the above-described techniques distinguish information such as patient information vs. employee information in the context of patient records from a healthcare database.

What is claimed is:

1. A method of identifying whether electronic data under test includes particular information from a database, the method comprising:

deriving a set of sample tokens from the electronic data under test;

forming a set of sample fingerprints from the set of sample tokens, each sample fingerprint being based on a sample token of the set of sample tokens; and outputting a result signal based on a comparison between the set of sample fingerprints and a set of database fingerprints generated from records of the database, the result signal providing an indication of whether the electronic data under test includes the particular information from the database;

wherein deriving the set of sample tokens includes:
 parsing the electronic data under test into a series of un-normalized words, and
 removing predefined characters from the series of un-normalized words to form, as the set of sample tokens, a series of normalized words, each normalized word including a string of actual characters;

wherein forming the set of sample fingerprints from the set of sample tokens includes:

applying a hashing function to the string of actual characters of each normalized word of the series of normalized words to generate, as the set of sample fingerprints, hash results corresponding to the series of normalized words;

wherein outputting the result signal based on the comparison between the set of sample fingerprints and the set of database fingerprints includes:

searching the set of database fingerprints for the hash results and determining whether, for any record of the database, a predetermined number of database fingerprints corresponding to that record is found to match the hash results, and providing the result signal with one of (i) a first control value when, for any record of the database, the predetermined number of database fingerprints corresponding to that record is found to match the hash results, and (ii) a second control value when, for each record of the database, less than the predetermined number of database fingerprints corresponding to that record is found to match the hash results, the first value being different than the second value;

wherein the method further comprises:

blocking access to the electronic data under test when the result signal has the first control value, and permitting access to the electronic data under test when the result signal has the second control value;

wherein searching and determining includes:

receiving a set of fingerprint matching rules, providing a set of intermediate search results based on searching the set of database fingerprints for the hash results, and applying the set of fingerprint matching rules to the set of intermediate search results to identify whether, for any record of the database, the predetermined number of database fingerprints corresponding to that record is found to match the hash results;

wherein the set of database fingerprints resides in a database fingerprint structure which increases monotonically based on the database fingerprints of the set of database fingerprints; and wherein providing the set of intermediate search results based on searching the set of database fingerprints for the hash results includes:

carrying out a binary search of the database fingerprint structure for the hash results.

2. A method as in claim 1 wherein the electronic data under test is an email message; and wherein blocking and permitting includes:

preventing transmission of the email message from a secure electronic device to a non-secure electronic device over a computerized network when the result signal has the first control value, and allowing transmission of the email message from the secure electronic device to the non-secure electronic device over the computerized network when the result signal has the second control value.

3. A method as in claim 1 wherein the electronic data under test is an electronic document; and wherein blocking and permitting includes:

preventing copying of the electronic document from a secure electronic device to a non-secure electronic device when the result signal has the first control value, and allowing copying of the electronic document from the secure electronic device to the non-secure electronic device when the result signal has the second control value.

4. A method as in claim 1 wherein the electronic data under test is an unencrypted version of an electronic file stored on a server; and wherein blocking and permitting includes:

generating an encrypted version of the electronic file from the unencrypted version of an electronic file and replacing, on the server, the unencrypted version of an electronic file with the encrypted version of the electronic file when the result signal has the first control value, and allowing the unencrypted version of the electronic file stored on the server to remain intact when the result signal has the second control value.

5. A method as in claim 1 wherein receiving the set of fingerprint matching rules includes:

obtaining at least one multi-token matching rule which imposes a proximity threshold between discovered individual fingerprint matches.

6. A method as in claim 1 wherein receiving the set of fingerprint matching rules includes:

obtaining at least one matching rule which labels certain database fingerprints for optional matching to enable incorporation within the result signal of a confidence ranking which is based on a number of optional matching sample fingerprints.

7. A method as in claim 1, further comprising:

querying the records of the database to create a list of query results, and generating the set of database fingerprints from the list of query results.

8. A method as in claim 7 wherein each query result of the list of query results includes a set of un-normalized words corresponding to a record of the database; and wherein generating the set of database fingerprints from the list of query results includes, for each query result, (i) removing predefined characters from the set of un-normalized words of that query result to form a set of normalized words, each normalized word including a string of actual characters, (ii) applying a hashing function to the string of actual characters of each normalized word to provide a set of hash results as the set of database fingerprints, and (iii) storing the hash results in a database fingerprint structure.

9. A method as in claim 8 wherein each hash result includes a fingerprint value; and wherein storing the hash results in a database fingerprint structure includes:

ordering the hash results within the database fingerprint structure to increase monotonically based on fingerprint value.

10. Electronic circuitry, comprising:

an input/output (I/O) interface;

memory which stores a set of database fingerprints generated from records of a database; and an analyzing circuit coupled to the I/O interface and the memory, the analyzing circuit being constructed and arranged to:

derive a set of sample tokens from electronic data under test, form a set of sample fingerprints from the set of sample tokens, each sample fingerprint being based on a sample token of the set of sample tokens, and output a result signal based on a comparison between the set of sample fingerprints and the set of database fingerprints, the result signal providing an indication of whether the electronic data under test includes particular information from the database;

wherein the analyzing circuit, when deriving the set of sample tokens, is constructed and arranged to:
  parse the electronic data under test into a series of un-normalized words, and
  remove predefined characters from the series of un-normalized words to form, as the set of sample tokens, a series of normalized words, each normalized word including a string of actual characters;
wherein the analyzing circuit, when forming the set of sample fingerprints from the set of sample tokens, is constructed and arranged to:
  apply a hashing function to the string of actual characters of each normalized word of the series of normalized words to generate, as the set of sample fingerprints, hash results corresponding to the series of normalized words;
wherein the analyzing circuit, when outputting the result signal based on the comparison between the set of sample fingerprints and the set of database fingerprints, is constructed and arranged to:
  search the set of database fingerprints for the hash results and determining whether, for any record of the database, a predetermined number of database fingerprints corresponding to that record is found to match the hash results, and
  provide the result signal with one of (i) a first control value when, for any record of the database, the predetermined number of database fingerprints corresponding to that record is found to match the hash results, and (ii) a second control value when, for each record of the database, less than the predetermined number of database fingerprints corresponding to that record is found to match the hash results, the first value being different than the second value;
wherein the analyzing circuit is further constructed and arranged to:
  block access to the electronic data under test when the result signal has the first control value, and permitting access to the electronic data under test when the result signal has the second control value;
wherein the analyzing circuit, when searching and determining, is constructed and arranged to:
  receive a set of fingerprint matching rules,
  provide a set of intermediate search results based on searching the set of database fingerprints for the hash results, and
  apply the set of fingerprint matching rules to the set of intermediate search results to identify whether, for any record of the database, the predetermined number of database fingerprints corresponding to that record is found to match the hash results;
wherein the set of database fingerprints resides in a database fingerprint structure which increases monotonically based on the database fingerprints of the set of database fingerprints; and
wherein the analyzing circuit, when providing the set of intermediate search results based on searching the set of database fingerprints for the hash results, is constructed and arranged to:
  carry out a binary search of the database fingerprint structure for the hash results.

11. Electronic circuitry as in claim 10, further comprising:
an aggregating circuit in communication with the memory, the aggregating circuit being constructed and arranged to query the records of the database to create a list of query results, and generate the set of database fingerprints from the list of query results for storage in the memory.

12. Electronic circuitry as in claim 11 wherein each query result of the list of query results includes a set of un-normalized words corresponding to a record of the database; and
wherein the aggregating circuit, when generating the set of database fingerprints from the list of query results, is constructed and arranged to:
  for each query result, (i) remove predefined characters from the set of un-normalized words of that query result to form a set of normalized words, each normalized word including a string of actual characters, (ii) apply a hashing function to the string of actual characters of each normalized word to provide a set of hash results as the set of database fingerprints, and (iii) store the hash results in a database fingerprint structure in the memory.

13. A method as in claim 8,
wherein the list of query results includes a set of data categories, each data category of the set of data categories corresponding to a field in the database; and
wherein the method further comprises:
  receiving a set of fingerprint matching rules, the set of fingerprint matching rules being based on the set of data categories, and
  providing the set of fingerprint rules to the database fingerprint structure.

14. A method of identifying whether electronic data under test includes particular information from a database, the method comprising:
  deriving a set of sample tokens from the electronic data under test;
  forming a set of sample fingerprints from the set of sample tokens, each sample fingerprint being based on a sample token of the set of sample tokens; and
  outputting a result signal based on a comparison between the set of sample fingerprints and a set of database fingerprints generated from records of the database, the result signal providing an indication of whether the electronic data under test includes the particular information from the database;
wherein the method further comprises:
  querying the records of the database to create a list of query results, and generating the set of database fingerprints from the list of query results;
wherein each query result of the list of query results includes a set of un normalized words corresponding to a record of the database;
wherein generating the set of database fingerprints from the list of query results includes, for each query result, (i) removing predefined characters from the set of un normalized words of that query result to form a set of normalized words, each normalized word including a string of actual characters, (ii) applying a hashing function to the string of actual characters of each normalized word to provide a set of hash results as the set of database fingerprints, and (iii) storing the hash results in a database fingerprint structure;
wherein the list of query results includes a set of data categories, each data category of the set of data categories corresponding to a field in the database;
wherein the method further comprises:
  receiving a set of fingerprint matching rules, the set of fingerprint matching rules being based on the set of data categories, and providing the set of fingerprint rules to the database fingerprint structure; and wherein each query result of the list of query results includes a set of cells, each cell of the set of cells including an un-normalized word of the set of un-normalized words and being associated with a data category of the set of data categories, each un-normalized word of the set of un-normalized words being a value of the data category associated with the cell;

wherein removing predefined characters from the set of un-normalized words of that query result to form a set of normalized words includes:

for each cell of the set of cells of that query result, deleting the predefined characters from the un-normalized word of the cell to form a normalized word associated with the cell; and wherein receiving the set of fingerprint matching rules includes:

obtaining at least one matching rule which labels certain database fingerprints of the set of database fingerprints for required matching, a database fingerprint being labeled for required matching being based on whether the database fingerprint is a hash result resulting from an application of the hashing function to a set of actual characters of a normalized word associated with a cell to which a particular data category of the set of data categories is associated.

15. Electronic circuitry, comprising:

an input/output (I/O) interface;

memory which stores a set of database fingerprints generated from records of a database; and an analyzing circuit coupled to the I/O interface and the memory, the analyzing circuit being constructed and arranged to:

derive a set of sample tokens from electronic data under test, form a set of sample fingerprints from the set of sample tokens, each sample fingerprint being based on a sample token of the set of sample tokens, and output a result signal based on a comparison between the set of sample fingerprints and the set of database fingerprints, the result signal providing an indication of whether the electronic data under test includes particular information from the database;

wherein the analyzing circuit is further constructed and arranged to:

query the records of the database to create a list of query results, and generating the set of database fingerprints from the list of query results;

wherein each query result of the list of query results includes a set of un normalized words corresponding to a record of the database;

wherein the analyzing circuit, when generating the set of database fingerprints from the list of query results, is constructed and arranged to, for each query result, (i) remove predefined characters from the set of un normalized words of that query result to form a set of normalized words, each normalized word including a string of actual characters, (ii) apply a hashing function to the string of actual characters of each normalized word to provide a set of hash results as the set of database fingerprints, and (iii) store the hash results in a database fingerprint structure;

wherein the list of query results includes a set of data categories, each data category of the set of data categories corresponding to a field in the database;

wherein the analyzing circuit is further constructed and arranged to:

receive a set of fingerprint matching rules, the set of fingerprint matching rules being based on the set of data categories, and provide the set of fingerprint rules to the database fingerprint structure; and wherein each query result of the list of query results includes a set of cells, each cell of the set of cells including an un-normalized word of the set of un-normalized words and being associated with a data category of the set of data categories, each un-normalized word of the set of un-normalized words being a value of the data category associated with the cell;

wherein the analyzing circuit, when removing predefined characters from the set of un-normalized words of that query result to form a set of normalized words, is constructed and arranged to:

for each cell of the set of cells of that query result, delete the predefined characters from the un-normalized word of the cell to form a normalized word associated with the cell; and wherein the analyzing circuit, when receiving the set of fingerprint matching rules, is constructed and arranged to:

obtain at least one matching rule which labels certain database fingerprints of the set of database fingerprints for required matching, a database fingerprint being labeled for required matching being based on whether the database fingerprint is a hash result resulting from an application of the hashing function to a set of actual characters of a normalized word associated with a cell to which a particular data category of the set of data categories is associated.

* * * * *